(12) United States Patent
Xu et al.

(10) Patent No.: US 9,980,249 B2
(45) Date of Patent: May 22, 2018

(54) METHOD AND DEVICE FOR ALLOCATING UPLINK SHARED CHANNEL RESOURCE, AND COMMUNICATION SYSTEM

(75) Inventors: Hao Xu, Beijing (CN); Jian He, Beijing (CN); Zhiqiu Zhu, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 129 days.

(21) Appl. No.: 13/979,446

(22) PCT Filed: Jan. 11, 2012

(86) PCT No.: PCT/CN2012/070238
§ 371 (c)(1),
(2), (4) Date: Jul. 12, 2013

(87) PCT Pub. No.: WO2012/095004
PCT Pub. Date: Jul. 19, 2012

(65) Prior Publication Data
US 2013/0294280 A1 Nov. 7, 2013

(30) Foreign Application Priority Data
Jan. 14, 2011 (CN) .......................... 2011 1 0008171

(51) Int. Cl.
*H04W 72/04* (2009.01)
*H04W 72/08* (2009.01)

(52) U.S. Cl.
CPC ......... *H04W 72/04* (2013.01); *H04W 72/085* (2013.01); *H04W 72/0486* (2013.01)

(58) Field of Classification Search
None
See application file for complete search history.

(56) References Cited

U.S. PATENT DOCUMENTS 8,439,842 B2 * 5/2013 Kabakov .................. A61B 8/02
   600/437
8,812,040 B2 * 8/2014 Liu et al. ..................... 455/509
(Continued)

FOREIGN PATENT DOCUMENTS

CN    1852073 A   10/2006
CN  101179837 A    5/2008
(Continued)

OTHER PUBLICATIONS

International Search Report of PCT/CN2012/070238, dated Apr. 19, 2013, 2 pages.

*Primary Examiner* — Jeffrey M Rutkowski
*Assistant Examiner* — Jonathan B Wood
(74) *Attorney, Agent, or Firm* — Oliff PLC

(57) ABSTRACT

A method that allocates uplink shared channel resources includes acquiring the volume of data-to-be-transmitted and an uplink channel quality indication. The method further includes, based on the volume of data-to-be-transmitted acquired, determining a set of resource profiles of the uplink channel quality indication and a resource number. The method further includes judging whether or not the uplink channel quality indication comprised within the set of resource profiles is identical to the uplink channel quality indication acquired. If they are identical, using a corresponding set of resource profiles as a final resource profile; and if they are different, combining an uplink transmission power with the corresponding set of resource profile to determine the final resource profile. Under the premise of ensuring QoS, the method allows for minimization of transmission power of each terminal, thus reducing inter-system interference, allowing system performance to be further improved.

7 Claims, 3 Drawing Sheets

(56) References Cited

U.S. PATENT DOCUMENTS

| | | | |
|---|---|---|---|
| 9,001,768 B2* | 4/2015 | Lee et al. | 370/329 |
| 2007/0197252 A1* | 8/2007 | Watanabe et al. | 455/522 |
| 2008/0220806 A1* | 9/2008 | Shin et al. | 455/522 |
| 2009/0054015 A1* | 2/2009 | Ishizaki | H04B 7/0632 455/101 |
| 2009/0303950 A1* | 12/2009 | Ofuji et al. | 370/329 |
| 2010/0020704 A1* | 1/2010 | Hu et al. | 370/252 |
| 2010/0054147 A1* | 3/2010 | Ishii | 370/252 |
| 2010/0120438 A1* | 5/2010 | Kone et al. | 455/444 |
| 2010/0150085 A1* | 6/2010 | Ishii et al. | 370/329 |
| 2010/0151876 A1* | 6/2010 | Park | H04W 72/082 455/452.2 |
| 2010/0203882 A1* | 8/2010 | Frenger | H04W 72/1231 455/423 |
| 2010/0238883 A1* | 9/2010 | Borran et al. | 370/329 |
| 2011/0002290 A1* | 1/2011 | Kim et al. | 370/329 |
| 2011/0013723 A1* | 1/2011 | Suga | H04L 1/0002 375/295 |
| 2011/0085513 A1* | 4/2011 | Chen et al. | 370/330 |
| 2011/0110322 A1* | 5/2011 | Koyanagi et al. | 370/329 |
| 2011/0305195 A1* | 12/2011 | Forck | H04B 7/022 370/328 |
| 2012/0134275 A1* | 5/2012 | Choi et al. | 370/241 |
| 2012/0147773 A1* | 6/2012 | Kim et al. | 370/252 |
| 2012/0147831 A1* | 6/2012 | Golitschek | 370/329 |
| 2012/0243497 A1* | 9/2012 | Chung et al. | 370/329 |
| 2012/0282889 A1* | 11/2012 | Tanaka et al. | 455/405 |
| 2012/0307697 A1* | 12/2012 | Mukhopadhyay | H04W 4/001 370/311 |
| 2012/0314594 A1* | 12/2012 | Mahadevappa | H04W 24/10 370/252 |
| 2013/0111010 A1* | 5/2013 | Driesen | H04L 12/6418 709/224 |
| 2014/0328281 A1* | 11/2014 | Ko et al. | 370/329 |

FOREIGN PATENT DOCUMENTS

| | | |
|---|---|---|
| CN | 102056306 A | 5/2011 |
| WO | 2010/074216 A1 | 7/2010 |

* cited by examiner

METHOD AND DEVICE FOR ALLOCATING UPLINK SHARED CHANNEL RESOURCE, AND COMMUNICATION SYSTEM

CROSS REFERENCE TO RELATED APPLICATIONS

This application is the National Stage of PCT/CN2012/070238 filed on Jan. 11, 2012, which claims priority under 35 U.S.C. § 119 of Chinese Application No. 201110008171.5 filed on Jan. 14, 2011, the disclosures of which are incorporated by reference. The international application under PCT article 21(2) was not published in English.

FIELD OF THE PRESENT INVENTION

The present invention relates to the field of communication technology, in particular to the method and device for allocating uplink shared channel resource, and communication system.

BACKGROUND OF THE PRESENT INVENTION

In TD-SCDMA (Time Division-Synchronous Code Division Multiple Access), LTE (Long Term Evolution) and other communication systems, the uplink shared channel refers to an uplink transmission channel shareable among several UE (User Equipment).

The uplink shared channel resource in a communication system is allocated usually by the following methods: first acquiring a channel quality indication, then looking up the mapping table of the channel quality indication and a resource number by use of the channel quality indication, to search a resource number capable of satisfying the volume of data-to-be-transmitted of user as the basis for subsequent allocation of resources.

Take LTE system as an example. The shared channel resources are all allocated at base station. UE sends an uplink Sounding reference symbol; then the base station detects and converts this reference symbol and characterizes the uplink shared channel quality indication through MCS (Modulation Coding Scheme). After acquiring the channel quality indication, the base station searches a resource profile capable of satisfying the volume of data-to-be-transmitted of user by looking up TB_size table and uses this resource profile as a resource allocation result. Wherein, the TB_size table is the mapping table of the channel quality indication and the resource number, which is shown in Table 1; the resource profile is indicated by MCS level and PRB number; PRB refers to physical resource block (Physical Resource Block), used to describe the actual physical resource allocation; PRB number is the resource number mentioned above.

For example, Table 1 is TB_size table with LTE standard definition, which lists the tables in a system bandwidth of 1.4 MHz. The column $I_{TBS}$ in Table 1 corresponds to the channel quality indication MCS, with the value ranging from 0 to 26; the row $N_{PRB}$ corresponds to the occupied PRB number, with the value ranging from 1 to 110, and ranging from 1 to 6 when the bandwidth is 1.4 MHz; the data in the table indicate the data volume tb_size able to carry by the corresponding resource profile (MCS level, PRB number). When the bandwidth is 1.4 MHz, for an uplink shared channel, the base station acquires the wideband channel quality indication $MCS_{wideband}=3$ by measuring the uplink Sounding reference symbol sent the UE1 and the volume of data-to-be-transmitted of UE1 $UE1_{data}=200$ bits. By looking up the fourth row (MCS=3 row) of Table 1, we can know the data volume able to carry by the resource profile (MCS=3, PRB_NUM=4) is 208 bits upon $N_{PRB}=4$, which is greater than the volume of data-to-be-transmitted of the UE1 (200 bits), therefore, the resource profile (MCS=3, PRB_NUM=4) can be used as a basis for resource allocation and the specific location of the allocated resource shall be further determined. Finally, the MCS level and the location of the allocated resource are transmitted to UE1 via a control channel; UE1 transmits uplink data in the specified resource location as per designated MCS.

TABLE 1

TB_size Table [B = 1.4 MHz] with LTE Standard Definition

| | $N_{PRB}$ | | | | | |
|---|---|---|---|---|---|---|
| $I_{TBS}$ | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | 328 | 176 | 256 | 392 | 504 | 600 |
| 7 | 104 | 224 | 328 | 472 | 584 | 712 |
| 8 | 120 | 256 | 392 | 536 | 680 | 808 |
| 9 | 136 | 296 | 456 | 616 | 776 | 936 |
| 10 | 144 | 328 | 504 | 680 | 872 | 1032 |
| 11 | 176 | 376 | 584 | 776 | 1000 | 1192 |
| 12 | 208 | 440 | 680 | 904 | 1128 | 1352 |
| 13 | 224 | 488 | 744 | 1000 | 1256 | 1544 |
| 14 | 256 | 552 | 840 | 1128 | 1416 | 1736 |
| 15 | 280 | 600 | 904 | 1224 | 1544 | 1800 |
| 16 | 328 | 632 | 968 | 1288 | 1608 | 1928 |
| 17 | 336 | 696 | 1064 | 1416 | 1800 | 2152 |
| 18 | 376 | 776 | 1160 | 1544 | 1992 | 2344 |
| 19 | 408 | 840 | 1288 | 1736 | 2152 | 2600 |
| 20 | 440 | 904 | 1384 | 1864 | 2344 | 2792 |
| 21 | 488 | 1000 | 1480 | 1992 | 2472 | 2984 |
| 22 | 520 | 1064 | 1608 | 2152 | 2664 | 3240 |
| 23 | 552 | 1128 | 1736 | 2280 | 2856 | 3496 |
| 24 | 584 | 1192 | 1800 | 2408 | 2984 | 3624 |
| 25 | 616 | 1256 | 1864 | 2536 | 3112 | 3752 |
| 26 | 712 | 1480 | 2216 | 2984 | 3752 | 4392 |

The above method for allocating uplink channel resource can satisfy the resource allocation of the volume of data-to-be-transmitted of user under normal circumstances, but in some cases, it may cause too much interference, reducing the overall performance of the system.

SUMMARY OF THE PRESENT INVENTION

The present invention puts forward the method and device for allocating uplink shared channel resource, and communication system, for solving the problem of the overall performance of the communication system being reduced in an existing allocating method.

For solving the above problem, the present invention discloses the method for allocating uplink shared channel resource, comprising:

Acquiring the volume of data-to-be-transmitted and an uplink channel quality indication;

On the basis of the volume of data-to-be-transmitted acquired, determining at least one set of resource profile of the uplink channel quality indication and a resource number;

Judging of whether or not the uplink channel quality indication comprised within the at least one set of resource profile is identical to the uplink channel quality indication acquired, if identical, using a corresponding set of resource profile as a final resource profile; and if different, combining an uplink transmission power with the corresponding set of resource profile to determine the final resource profile.

Preferably, combining an uplink transmission power with the corresponding set of resource profile to determine the final resource profile comprises: selecting a resource profile meeting the following requirements from the at least one set of resource profile determined; the requirements include: the uplink channel quality indication comprised within the resource profile shall be smaller than the uplink channel quality indication acquired; the uplink transmission power shall be combined with the at least one set of resource profile meeting the above requirements to determine the final resource profile.

Preferably, combining the uplink transmission power with the at least one set of resource profile meeting the above requirements to determine the final resource profile comprises: in case multiple sets of resource profiles meet the above requirements, calculating the uplink transmission power of each set of resource profile respectively, and selecting a set of profile resource of minimum uplink transmission power as a final resource profile; if only one set of resource profile meets the above requirements, using this set of resource profile as the final resource profile.

Preferably, the method further comprises: if the uplink channel quality indication comprised within the resource profile is greater than the uplink channel quality indication acquired, the resource profile failing to meet the above requirements; when no resource profile in the at least one set of resource profile determined meets the above requirements, determining a resource number corresponding to the volume of the data-to-be-transmitted and the uplink channel quality indication acquired according to the mapping relationship among the volume of data-carried, uplink channel quality indication and resource number, and combing the resource number with the uplink channel quality indication into a resource profile as the final resource profile.

Preferably, determining at least one of resource profile of the uplink channel quality indication and a resource number on the basis of the volume of data-to-be-transmitted acquired comprises: determining at least one resource profile code corresponding to the volume of data-to-be-transmitted acquired on the basis of the mapping relationship between the volume of data-carried and resource profile code, each resource profile code corresponding to a set of resource profile of the uplink channel quality indication and resource number; calculating the resource profile of the uplink channel quality indication and resource number corresponding to each resource profile code determined.

Preferably, determining at least one resource profile code corresponding to the volume of data-to-be-transmitted acquired on the basis of the mapping relationship between the volume of data-carried and the resource profile code comprises: looking up the minimum volume of data-carried equal to or greater than the volume of data-to-be-transmitted, and determining at least one resource profile code corresponding to the minimum volume of data-carried as the resource profile corresponding to the volume of data-to-be-transmitted.

Preferably, calculating the resource profile of the uplink channel quality indication and resource number corresponding to each resource profile code determined comprises: calculating as per the conversion formula of the resource profile code and the resource profile; said conversion formula is: resource profile code=uplink channel quality indication×weight factor 1+resource number×weight factor 2.

The present invention further provides the device for allocating uplink shared channel resource, comprising:

An information acquiring module, for acquiring the volume of data-to-be-transmitted and an uplink channel quality indication;

A preliminary determination module, for determining at least one set of resource profile of the uplink channel quality indication and a resource number on the basis of the volume of data-to-be-transmitted acquired;

A resource allocating module, for judging of whether or not the uplink channel quality indication comprised within the at least one set of resource profile is identical to the uplink channel quality indication acquired, if identical, using a corresponding set of resource profile as a final resource profile; and if different, combining an uplink transmission power with the corresponding set of resource profile to determine the final resource profile.

Preferably, the resource allocating module comprises: a judging sub-module, for judging of whether or not the uplink channel quality indication comprised within the at least one set of resource profile determined is identical to the uplink channel quality indication acquired, if identical, using a corresponding set of resource profile as a final resource profile; and if different, triggering a selecting sub-module; a selecting sub-module, for selecting a resource profile meeting the following requirements from the at least one set of resource profile determined when the uplink channel quality indication comprised within the at least one set of resource profile determined is different from the uplink channel quality indication acquired; the requirements include: the uplink channel quality indication comprised within the resource profile shall be smaller than the uplink channel quality indication acquired; the uplink transmission power shall be combined with the at least one set of resource profile meeting the above requirements to determine the final resource profile.

Preferably, the resource allocating module further comprises: a power joint optimization sub-module, for calculating the uplink transmission power of each set of resource profile respectively when multiple sets of resource profiles meet the above requirements, and selecting a set of resource profile of minimum uplink transmission power as a final resource profile; when only one set of resource profile meets the above requirements, using it as the final resource profile.

Preferably, if the uplink channel quality indication comprised within the resource profile is greater than the uplink channel quality indication acquired, the resource profile fails to meet the above requirements; and the resource allocating module further comprises: a supplementary determination sub-module, for determining a resource number corresponding to the volume of data-to-be-transmitted and the uplink channel quality indication acquired according to the mapping relationship among the volume of data-carried, uplink channel quality indication and resource number when no resource profile in the at least one set of resource profile determined meets the above requirements, and combining the resource number with the uplink channel quality indication acquired into a resource profile as the final resource profile.

Preferably, the preliminary determination module comprises: a table look-up sub-module, for determining at least one resource profile code corresponding to the volume of data-to-be-transmitted acquired on the basis of the mapping relationship between the volume of data-carried and the resource profile code, each resource profile code corresponding to a set of resource profile of the uplink channel quality indication and the resource number; a calculating sub-module, for calculating the resource profile of the uplink channel quality indication and resource number corresponding to each resource profile code determined.

Preferably, the table look-up sub-module looks up the minimum volume of data-carried equal to or greater than the volume of data-to-be-transmitted on the basis of the mapping relationship between the volume of data-carried and resource profile code, and determines at least one resource profile code corresponding to the minimum volume of data-carried as the resource profile code corresponding to the volume of data-to-be-transmitted.

Preferably, the calculating sub-module calculates as per the conversion formula of the resource profile code and the resource profile, the conversion formula is: resource profile code=uplink channel quality indication×weight factor 1+resource number×weight factor 2.

The present invention further provides the communication system, comprising a terminal and a base station; said base station comprises the above device for allocating uplink shared channel resource.

Compared with the prior art, the present invention possesses the following advantages:

In the determination of the resource profile satisfying the volume of data-to-be-transmitted, the present invention not only bases on the channel quality indication that a terminal reports, but also takes into consideration the overall power resource of the system, to combine the uplink transmission power to determine the final resource profile. Under the premise of ensuring QoS (Quality of Service), the present invention allows for minimization of transmission power of each terminal, thus reducing inter-system interference, allowing system performance to be further improved.

DETAILED DESCRIPTION OF THE EMBODIMENTS OF THE PRESENT INVENTION

Figure 1:
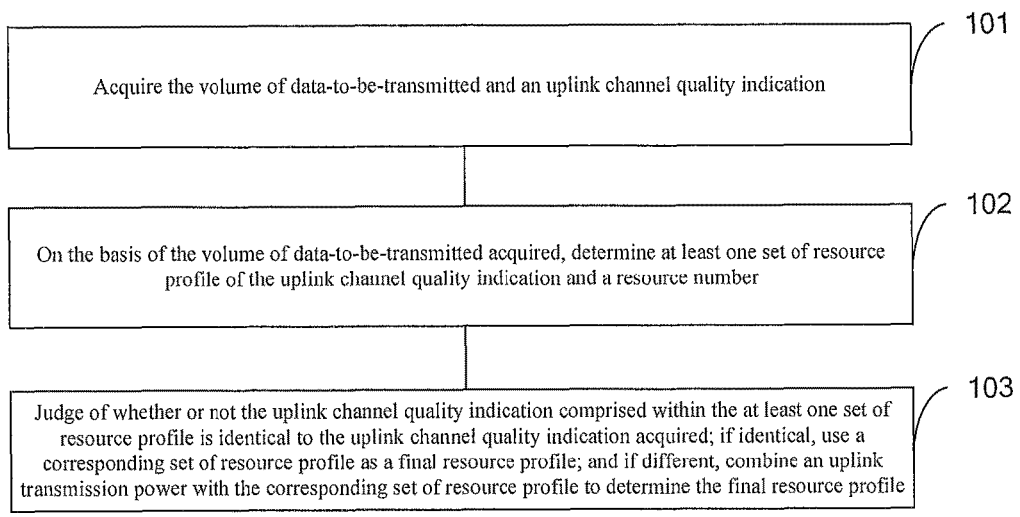
FIG. 1 is the flow diagram of the method for allocating uplink shared channel resource described in the embodiments of the present invention.

To make the above purpose, characteristics and advantages of the present invention clearer and catchier, the technical solution of the present invention is explained in a detailed way with reference to the drawings and specific embodiments.

On the basis capable of satisfying the volume of data-to-be-transmitted of a user, the present invention puts forward the method and device in consideration of the joint power for resource profile determination to determine the final resource allocation profile (MCS level, PRB number), allowing system performance to be further improved.

The present invention proposes the following ideas:

According to the study, there are equal-sized volumes of data-carried tb_size in the TB_size tables shown in Table 1, but the corresponding resource profiles (MCS level, PRB number) are different. In detail, one tb_size value in Table 1 may correspond to multiple sets of different resource profiles (MCS level, PRB number).

In other words, in the case of multiple sets of different resource profiles, the volume of the data able to carry tb_size is identical.

On the basis of the above phenomenon discovered, the tb_size in Table 1 of the present invention is sorted in ascending order and all of the corresponding resource profiles for each different tb_size are summarized to acquire a resource profile summary sheet in the case of 1.4 MHz system bandwidth shown in Table 2.

TABLE 2

Resource Profile Summary Sheet of Different tb_size

| tb_size | Resource profile code |
|---|---|
| 16 | 1 |
| 24 | 11 |
| 32 | 2, 21 |
| 40 | 31 |
| 56 | 3, 12, 41 |
| 72 | 22, 51 |
| 88 | 4, 13 |
| 104 | 32, 71 |
| 120 | 5, 42, 81 |
| 136 | 91 |
| 144 | 14, 23, 52, 101 |
| 152 | 6 |
| 176 | 15, 24, 33, 62, 111 |
| 208 | 16, 25, 34, 43, 121 |
| 224 | 53, 72, 131 |
| 256 | 26, 35, 44, 63, 82, 141 |
| 280 | 151 |
| 296 | 92 |
| 328 | 36, 45, 54, 61, 73, 102, 161 |
| 336 | 171 |
| 376 | 112, 181 |
| 392 | 64, 83 |
| 408 | 46, 191 |
| 424 | 55 |
| 440 | 122, 201 |
| 456 | 93 |
| 472 | 74 |
| 488 | 132, 211 |
| 504 | 56, 65, 103 |
| 520 | 221 |
| 536 | 84 |
| 552 | 142, 231 |
| 584 | 75, 113, 241 |
| 600 | 66, 152 |
| 616 | 94, 251 |
| 632 | 162 |
| 680 | 85, 104, 123 |
| 696 | 172 |
| 712 | 76, 261 |
| 744 | 133 |
| 776 | 95, 114, 182 |
| 808 | 86 |
| 840 | 143, 192 |
| 872 | 105 |
| 904 | 124, 153, 202 |
| 936 | 96 |
| 968 | 163 |
| 1000 | 115, 134, 212 |
| 1032 | 106 |
| 1064 | 173, 222 |
| 1128 | 125, 144, 232 |
| 1160 | 183 |
| 1192 | 116, 242 |
| 1224 | 154 |
| 1256 | 135, 252 |
| 1288 | 164, 193 |
| 1352 | 126 |
| 1384 | 203 |
| 1416 | 145, 174 |
| 1480 | 213, 262 |

TABLE 2-continued

Resource Profile Summary Sheet of Different tb_size

| tb_size | Resource profile code |
|---|---|
| 1544 | 136, 155, 184 |
| 1608 | 165, 223 |
| 1736 | 146, 194, 233 |
| 1800 | 156, 175, 243 |
| 1864 | 204, 253 |
| 1928 | 166 |
| 1992 | 185, 214 |
| 2152 | 176, 195, 224 |
| 2216 | 263 |
| 2280 | 234 |
| 2344 | 186, 205 |
| 2408 | 244 |
| 2472 | 215 |
| 2536 | 254 |
| 2600 | 196 |
| 2664 | 225 |
| 2792 | 206 |
| 2856 | 235 |
| 2984 | 216, 245, 264 |
| 3112 | 255 |
| 3240 | 226 |
| 3496 | 236 |
| 3624 | 246 |
| 3752 | 256, 265 |
| 4392 | 266 |

The resource profile code in Table 2 indicates the resource allocation profile of the uplink channel quality indication and a resource number, one resource profile code corresponds to one resource profile. It can be seen from Table 2 that, one tb_size value may correspond to one resource profile code, or may correspond to multiple resource profile codes, that is, it may correspond to one resource profile or multiple resource profiles. There are a total of 162 tb_size values in Table 1, 122 tb_size have more than one resource profiles in Table 2 after summarization. That is, different resource profiles of the same tb_size account for 122/162≈77%.

The present invention puts forward the method for allocating uplink shared channel resource based on Table 2, in which the final resource allocation profile (MCS level, PRB number) can be determined by combining the system power.

See FIG. 1, the flow diagram of the method for allocating uplink shared channel resource described in the embodiments of the present invention.

The shared channel resource is allocated at a base station; therefore, the base station executes the following steps:

Step 101, acquiring the volume of data-to-be-transmitted and an uplink channel quality indication.

The base station acquires a channel quality indication that terminal reports by measuring the uplink Sounding reference symbol sent by the terminal. The embodiment also characterizes the uplink shared channel quality indication through MCS. Meanwhile, the base station can further acquire the size of the volume of data-to-be-transmitted of the terminal.

Step 102, on the basis of the volume of data-to-be-transmitted acquired, determining at least one set of resource profile of the uplink channel quality indication and a resource number.

By looking up Table 2, the base station can determine one or more resource profile codes satisfying the volume of data-to-be-transmitted, due to the conversion relationship between the resource profile code and resource profile (MCS level, PRB number), this conversion relationship is obtainable by mathematical calculation formulas. Therefore, one or more sets of resource profiles (MCS level, PRB number) can be acquired by use of this conversion relationship.

Step 103, judging of whether or not the uplink channel quality indication comprised within the at least one set of resource profile is identical to the uplink channel quality indication acquired, if identical, using a corresponding set of resource profile as a final resource profile; and if different, combining an uplink transmission power with the corresponding set of resource profile to determine the final resource profile.

If the MCS in the resource profile determined is identical to the MCS that terminal reports, just meeting the volume of data-to-be-transmitted of the terminal and channel quality requirements, this set (MCS level, PRB number) is selected to allocate to the terminal. If none of the several sets of resource profiles determined in step 102 is identical to the MCS that terminal reports, then the uplink transmission power can be combined to determine the final resource profile. The specific method can be: for the several sets of resource profiles, calculating the uplink transmission power of each set of resource profile respectively, and then selecting a set of resource profile of minimum uplink transmission power to allocate to the terminal.

The above method mainly refers to the handing of the situation when none of the resource profiles is identical to the MCS that terminal reports. Under the premise of satisfying the volume of data-to-be-transmitted of the terminal and ensuring Qos, as the overall power resource of the system is considered and the resource profile of minimum transmission power is selected to allocate to the terminal, the above methods allow for minimization of transmission power of each terminal, thus reducing inter-system interference, allowing system performance to be further improved.

Figure 2:
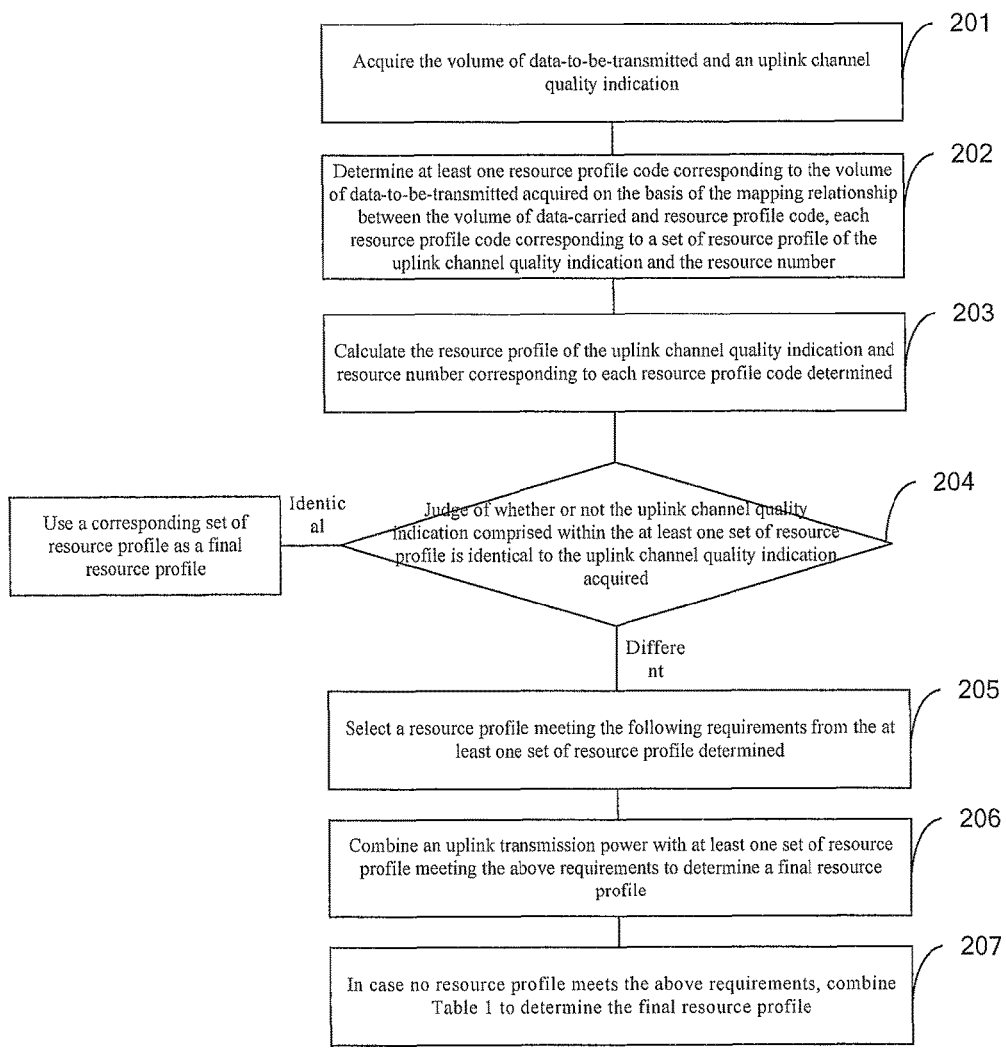
FIG. 2 is the flow diagram of the method for allocating uplink shared channel resource described in another embodiment of the present invention.

Based on the above contents, more detailed descriptions are made by another embodiment shown in FIG. 2.

See FIG. 2, the flow diagram of the method for allocating uplink shared channel resource.

Step 201, acquiring the volume of data-to-be-transmitted and an uplink channel quality indication.

That is, the base station acquires the volume of data-to-be-transmitted from the terminal and the uplink channel quality indication indicated by MCS.

How to determine at least one set of resource profile of the uplink channel quality indication and a resource number on the basis of the volume of data-to-be-transmitted acquired is described by the following steps 202 and 203.

Step 202, determining at least one resource profile code corresponding to the volume of data-to-be-transmitted acquired according to the mapping relationship between the volume of data-carried and resource profile code, each resource profile code corresponding to one set of resource profile of the uplink channel quality indication and a resource number.

Table 2 is the mapping relationship table between the volume of data-carried tb_size and resource profile code. In order to maximize the efficient use of system resources, preferably, it is necessary to look up Table 2 according to the volume of data-to-be-transmitted of the user to search the minimum tb_size value capable of satisfying the volume of data-to-be-transmitted of the user first. The table look-up method comprises the following specific steps:

Looking up the minimum volume of data-carried equal to or greater than the volume of data-to-be-transmitted on the basis of the mapping relationship between the volume of data-carried and resource profile code, and determining at least one resource profile code corresponding to the minimum volume of data-carried as the resource profile code corresponding to the volume of data-to-be-transmitted.

Step 203, calculating the resource profile of the uplink channel quality indication and the resource number corresponding to each resource profile code determined.

As mentioned, there is a conversion relationship between the resource profile code and resource profile (MCS level, PRB number); therefore, the resource profile (MCS level, PRB number) can be acquired by the calculation as per this conversion formula.

The conversion formula is:

Resource profile code=uplink channel quality indication×weight factor 1+resource number×weight factor 2.

When the weight factor 2 is equal to 1, the conversion formula is:

Resource profile code=MCS*β_factor+$N_{PRB\_NUM}$ (Formula 1)

When the system bandwidth B is equal to 1.4 MHz, discriminating factor β_factor=10, the value of the discriminating factor in the case of different system bandwidths is shown in Table 3:

TABLE 3

Value Table of Discriminating Factor in Different Bandwidth

| System bandwidth(MHz) | Number of resource block | Discriminating factor |
|---|---|---|
| 1.4 | 6 | 10 |
| 3 | 15 | 20 |
| 5 | 25 | 30 |
| 10 | 50 | 50 |
| 15 | 75 | 80 |
| 20 | 100 | 100 |

Based on formula 1, the formula of calculating MCS level and PRB number is as follows:

MCS=⌊Resource profile code/β_factor⌋ (Formula 2)

Wherein, ⌊x⌋ refers to rounding down;

$N_{PRB\_NUM}$=Resource profile code %β_factor (Formula 3)

% refers to taking remainder after division.

Furthermore, if the weight factor 1 is equal to 1, the above conversion formula is:

Resource profile code=MCS+$N_{PRB\_NUM}$*β_factor (Formula 4)

The method of calculating MCS level and PRB number based on formula 4 is similar to that of formula 2 and formula 3, which is not described here.

Step 204, judging of whether or not the uplink channel quality indication comprised within the at least one set of resource profile is identical to the uplink channel quality indication acquired;

If identical, using a corresponding set of resource profile as a final resource profile; and if different, continuing the following procedures and combining an uplink transmission power with the corresponding set of resource profile to determine the final resource profile, specifically comprising steps 205 to 207.

Step 205, selecting a resource profile meeting the following requirements from the at least one set of resource profile determined.

The requirements include: the uplink channel quality indication comprised within the resource profile shall be smaller than the uplink channel quality indication acquired.

The uplink channel quality indication acquired is the channel quality indication that terminal reports.

The decoding performance can be guaranteed by the above selection. The higher MCS level requires the higher decoding performance. In case of higher MCS selected, there may be incorrect decoding. Hence, under the premise of ensuring the volume of data-to-be-transmitted, we should try to select a resource profile with MCS level smaller than the channel quality indication that terminal reports.

Step 206, combining an uplink transmission power with the at least one set of resource profile meeting the above requirements to determine the final resource profile.

The resource profile with MCS level smaller than the channel quality indication reported shall be further selected in combination with power factors. One or more sets of resource profiles may be selected by step 205, if multiple sets of resource profiles meet the above requirements, calculate the uplink transmission power of each set of resource profile respectively and select a set of resource profile of minimum uplink transmission power as a final resource profile; if only one set of resource profile meets the above requirements, use this set of resource profile as the final resource profile.

Wherein, the transmission power can be calculated by any one of existing calculation methods, which is not limited in the embodiment of the present invention.

Step 207, combining Table 1 to determine the final resource profile if no resource profile meets the above requirements.

If the uplink channel quality indication comprised within the resource profile is greater than the uplink channel quality indication acquired, the resource profile fails to meet the above requirements. When no resource profile in the at least one set of resource profile determined meets the above requirements, determine a resource number corresponding to the volume of data-to-be-transmitted and the uplink channel quality indication acquired by the rules of satisfying the volume of data-to-be-transmitted of the terminal according to the mapping relationship (Table 1) among the volume of data-carried tb_size, uplink channel quality indication MCS and resource number PRB, and combine the resource number with the uplink channel quality indication acquired into a resource profile as the final resource profile.

In the following parts, the procedures shown in FIG. 2 are described by three embodiments.

Embodiment I

For an uplink shared channel, a base station acquires the wideband channel quality indication $MCS_{wideband}$=7 by measuring the uplink Sounding reference symbol sent by the UE1 and the volume of data-to-be-transmitted of UE1 $UE1_{data}$=140 bits. Look up Table 2 to find that the minimum tb_size capable of satisfying the volume of data-to-be-transmitted of the user is equal to 144 bits. Then, look up Table 2 to find that there are a total of 4 resource profile codes, being 14, 23, 52 and 101 respectively, when the tb_size is equal to 144 bits. Calculate the corresponding resource profile through formula 2 and formula 3 respectively, being (MCS=1, PRB_NUM=4), (MCS=2, PRB_NUM=3), (MCS=5, PRB_NUM=2) and (MCS=10, PRB_NUM=1). First judge of whether or not there is profile with the channel quality indication in the corresponding resource profile identical to the channel quality indication reported. The MCS level of the above resource profile is 1, 2, 5 and 10 respectively, there is no profile identical to the channel quality indication MCS=7 reported, then process secondary selection to pick up the profile with the channel quality indication smaller than the channel quality indication reported in the resource profiles, including (MCS=1, PRB_NUM=4), (MCS=2, PRB_NUM=3) and (MCS=5, PRB_NUM=2). Finally, calculate the uplink transmission power of the above three kinds of resource profiles respectively, the transmission power can be calculated by reference to corresponding LTE physical layer protocol, with the resource profile of minimum transmission power selected as the final resource profile for output.

Embodiment II

For an uplink shared channel, a base station acquires the wideband channel quality indication $MCS_{wideband}$=8 by measuring the uplink Sounding reference symbol sent by the UE1, and the volume of data-to-be-transmitted of the UE1 $UE1_{data}$=110 bits. Look up Table 2 to find the minimum tb_size capable of satisfying the volume of data-to-be-transmitted of the user is equal to 120 bits. Then look up Table to find that there are a total of 3 resource profile codes, being 5, 42 and 81 respectively, when the tb_size is equal to 120 bits. Calculate corresponding resource profiles by use of formula 2 and formula 3 respectively, being (MCS=0, PRB_NUM=5), (MCS=4, PRB_NUM=2) and (MCS=8, PRB_NUM=1). First judge of whether or not there is profile with the channel quality indication identical to the channel quality indication reported in the corresponding resource profile. MCS level of the above resource profile is respectively 0, 4 and 8, there is profile (MCS=8, PRB_NUM=1) identical to the channel quality indication MCS=8 reported, output the resource profile as the final resource profile.

Embodiment III

For an uplink shared channel, a base station acquires the wideband channel quality indication $MCS_{wideband}$=4 by measuring the uplink Sounding reference symbol sent by the UE1, and the volume of data-to-be-transmitted of the UE1 $UE1_{data}$=390 bits. Look up Table 2 to find that the minimum tb_size capable of satisfying the volume of data-to-be-transmitted of the user is equal to 392 bits. Then, look up Table 2 to find that there are a total of 2 resource profile codes, being 64 and 83 respectively, when the tb_size is equal to 392 bits. Calculate the corresponding resource profile by use of formula 2 and formula 3 respectively, being (MCS=6, PRB_NUM=4) and (MCS=8, PRB_NUM=3). First judge of whether or not there is profile with the channel quality indication identical to the channel quality indication reported in the corresponding resource profile. The MCS level of the above resource profile is 6 and 8 respectively, there is no resource profile identical to the channel quality indication MCS=4 reported. The second step is to search the resource profile with the MCS level smaller than the channel quality indication reported from the resource profiles, exit as no resource profile meeting the requirements is found, by looking up the fifth row (MCS=4 row) in Table 1 at MCS=4, it can be known that the volume of the data able to carry by the resource profile (MCS=4, PRB_NUM=6) is 408 bits in case of $N_{PRB}$=6, which is greater than the volume of data-to-be-transmitted of the UE1. The resource profile (MCS=4, PRB_NUM=6) is output as the final resource profile.

From the above, the invention is easy to realize, which only requires slightly adding storage space of a few tables on the basis of the original method, with the increase in computation complexity negligible.

Based on the above embodiment methods, the present invention further provides the corresponding device and system embodiments, specifically shown as follows.

Figure 3:
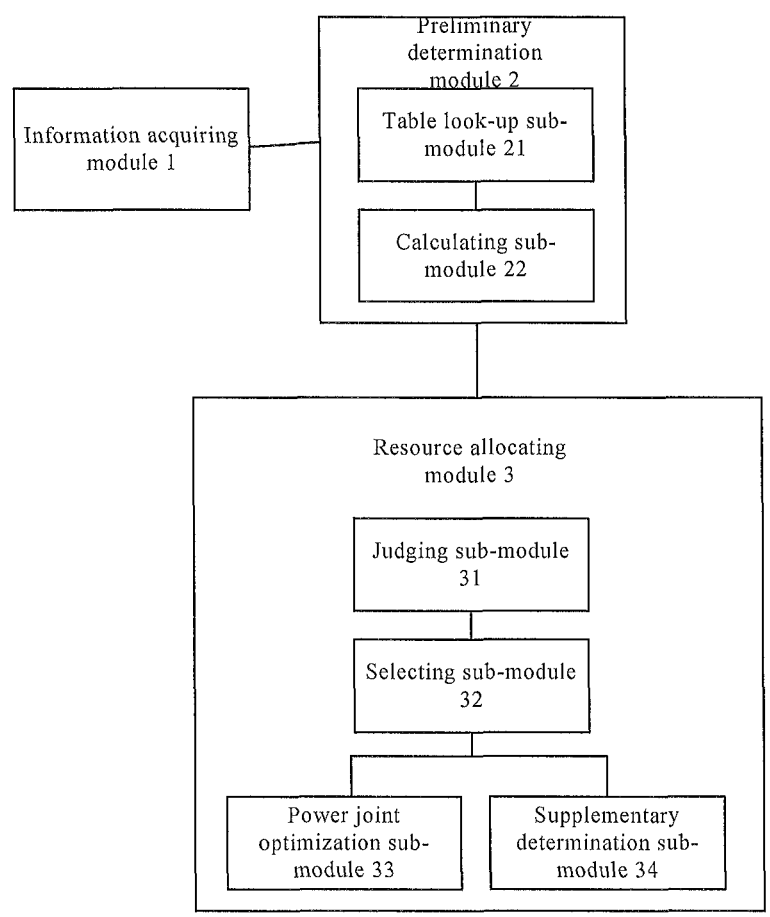
FIG. 3 is the structure diagram of the device for allocating uplink shared channel resource described in the embodiments of the present invention.

See FIG. 3, the structure diagram of the device for allocating uplink shared channel resource described in the embodiments of the present invention.

The device can be set at a base station and include an information acquiring module 1, a preliminary determination module 2 and a resource allocating module 3, wherein:

The information obtaining module 1 is used for acquiring the volume of data-to-be-transmitted and an uplink channel quality indication;

The preliminary determination module 2 is used for determining at least one set of resource profile of the uplink channel quality indication and a resource number on the basis of the volume of data-to-be-transmitted acquired;

The resource allocating module 3 is used for judging of whether or not the uplink channel quality indication comprised within the at least one set of resource profile is identical to the uplink channel quality indication acquired, if identical, using a corresponding set of resource profile as a final resource profile; and if different, combining an uplink transmission power with the corresponding set of resource profile to determine the final resource profile.

Preferably, in order to ensure decoding performance, the resource allocating module 3 can further comprise a judging sub-module 31 and a selecting sub-module 32, wherein:

The judging sub-module 31 is used for judging of whether or not the uplink channel quality indication comprised within the at least one set of resource profile is identical to the uplink channel quality indication acquired, if identical, using a corresponding set of resource profile as a final resource profile; and if different, triggering the selecting sub-module 32.

The selecting sub-module 32 is used for selecting a resource profile meeting the below requirements from the at least one set of resource profile determined when the uplink channel quality indication comprised within the at least one set of resource profile is different from the uplink channel quality indication acquired, the requirements include: the uplink channel quality indication comprised within the resource profile shall be smaller than the uplink channel quality indication acquired; and the uplink transmission power shall be combined with the at least one set of resource profile meeting the above requirements to determine the final resource profile.

Based on the selecting sub-module 32, the resource allocating module 3 further can comprise a power joint optimization sub-module 33, for calculating the uplink transmission power of each set of resource profile respectively when there are multiple sets of resource profiles meeting the above requirements and selecting a set of resource profile of minimum uplink transmission power as a final resource profile; and selecting this set of resource profile as the final resource profile when only one set of resource profile meets the above requirements.

If no resource profile meets the above requirements, the resource allocating module 3 further can comprise a supplementary determination sub-module 34, for determining a resource number corresponding to the volume of data-to-be-transmitted and the uplink channel quality indication acquired according to the mapping relationship among the volume of data-carried, uplink channel quality indication and resource number when no resource profile in the at least one set of resource profile determined meets the above requirements, and combing the resource number with the uplink channel quality indication acquired into a resource profile as the final resource profile. Wherein, if the uplink channel quality indication comprised within the resource profile is greater than the uplink channel quality indication acquired, the resource profile fails to meet the above requirements.

To be specific, the preliminary determination module 2 further can comprise a table look-up sub-module 21 and a calculating sub-module 22, wherein:

The table look-up sub-module 21 is used for determining at least one resource profile code corresponding to the volume of data-to-be-transmitted acquired on the basis of the mapping relationship between the volume of data-carried and resource profile code, each resource profile code corresponding to a set of resource profile of the uplink channel quality indication and resource number;

The calculating sub-module 22 is used for calculating the resource profile of the uplink channel quality indication and resource number corresponding to each resource profile code determined.

The table look-up sub-module 21 can look up the minimum volume of data-carried equal to or greater than the volume of data-to-be-transmitted on the basis of the mapping relationship between the volume of data-carried and resource profile code, and determining at least one resource profile code corresponding to the minimum volume of data-carried as the resource profile code corresponding to the volume of data-to-be-transmitted.

The calculating sub-module 22 can conduct calculation based on the conversion formula of the resource profile code and resource profile, said conversion formula is:

Resource profile code=uplink channel quality indication×weight factor 1+resource number×weight factor 2.

The above-mentioned device embodiment is relatively simply described as it is similar to the method embodiment, for related information, please refer to part description of method embodiment.

The embodiment of the present invention further provides a communication system which comprises a terminal and a base station. The terminal is used for sending an uplink reference signal to the base station, the base station can acquire the volume of data-to-be-transmitted and uplink channel quality indication upon the detection and conversion of the reference signal, and then allocate channel resource. Wherein, the base station comprises the device for allocating uplink shared channel resource described in the above embodiments, please refer to the description of the embodiment shown in FIG. 3, which is not described here.

All embodiments in the present invention are described in a progressive manner, each of embodiments focuses on the part different from other embodiments, please refer to each other for the same or similar parts among embodiments.

In the above part, the method and device for allocating uplink shared channel resource and communication system provided in the present invention are introduced in detail. Specific cases are used to expound the principle and implementation modes of the present invention. The above embodiments are described only for facilitating the comprehension of method of the present invention as well as core idea thereof; meanwhile, for general technical personnel in this field, some changes on the specific implementation ways and scope of application can be done based on the idea of the present invention, which shall not be construed as a limit to the present invention in conclusion.

The invention claimed is:

1. A method of receiving data transmitted from a user equipment at a base station via an uplink shared channel, comprising:
  acquiring a volume of data to be transmitted and a user equipment uplink channel quality indication from the user equipment;
  based on the acquired volume of data to be transmitted, determining a set of resource profiles, each having an uplink channel quality indication and a resource number, by:
    determining a resource profile code corresponding to the acquired volume of data to be transmitted according to a mapping relationship between volume of data-carried and resource profile code, each resource profile code corresponding to one set of resource profiles; and
    calculating the set of resource profiles from the resource profile code using a conversion formula that is: resource profile code=uplink channel quality indication×weight factor 1+resource number×weight factor 2, where one of weight factor 1 and weight factor 2 is set based on a bandwidth uplink shared channel and the other weight factor is set to 1;
  judging whether or not the uplink channel quality indication comprised within one of the set of resource profiles is identical to the user equipment uplink channel quality indication, and when one is identical, using the one of the set of resource profiles as a final resource profile, and when none are identical:
    combining an uplink transmission power with the set of resource profiles to determine the final resource profile by:
      selecting resource profiles from the set of resource profiles that meet a requirement that their uplink channel quality indications are smaller than the user equipment uplink channel quality indication;
      when multiple sets of resource profiles meet the requirement, calculating the uplink transmission power of each set of resource profiles respectively, and selecting the resource profile of minimum uplink transmission power as the final resource profile; and
      when only one resource profile meets the requirement, using that resource profile as the final resource profile; and
    receiving data transmitted from the user equipment at the base station via the uplink shared channel based on the final resource profile.

2. The method according to claim 1, wherein combining the uplink transmission power with the set of resource profiles further comprises:
  when no resource profile in the set of resource profiles meets the requirement, determining the resource number corresponding to the acquired volume of data to be transmitted according to a mapping relationship among volume of data-carried, uplink channel quality indication, and resource number, and combing the determined resource number with the user equipment uplink channel quality indication to generate the final resource profile.

3. The method according to claim 1, wherein determining the resource profile code further includes:
  looking up a minimum volume of data-carried equal to or greater than the acquired volume of data to be transmitted based on the mapping relationship between the volume of data-carried and resource profile code, and selecting a resource profile code corresponding to the minimum volume of data-carried as the resource profile code.

4. A base station for receiving data transmitted from a user equipment via an uplink shared channel, the base station comprising: a resource allocator configured to:
acquire a volume of data to be transmitted and a user equipment uplink channel quality indication from the user equipment;
based on the acquired volume of data to be transmitted, determine a set of resource profiles, each having an uplink channel quality indication and a resource number, by:
determining a resource profile code corresponding to the acquired volume of data to be transmitted based on a mapping relationship between volume of data-carried and resource profile code, each resource profile code corresponding to one set of resource profiles; and
calculating the set of resource profiles from the resource profile code using a conversion formula that is: resource profile code=uplink channel quality indication×weight factor 1+resource number×weight factor 2, where one of weight factor 1 and weight factor 2 is set based on a bandwidth uplink shared channel and the other weight factor is set to 1;
judge whether or not the uplink channel quality indication comprised within one of the set of resource profiles is identical to the user equipment uplink channel quality indication, and when one is identical, use the one of the set of resource profiles as a final resource profile, and when none are identical:
combine an uplink transmission power with the set of resource profiles to determine the final resource profile by:
selecting resource profiles from the set of resource profiles that meet a requirement that their uplink channel quality indications are smaller than the user equipment uplink channel quality indication;
when multiple sets of resource profiles meet the requirement, calculating the uplink transmission power of each set of resource profiles respectively, and selecting the resource profile of minimum uplink transmission power as the final resource profile; and
when only one set of resource profiles meets the requirement, using that resource profile as the final resource profile; and
a receiver that receives data transmitted from the user equipment via the uplink shared channel based on the final resource profile.

5. The base station according to claim 4, wherein the resource allocator is further configured to, in combining the uplink transmission power with the set of resource profiles:
when no resource profile in the set of resource profiles meets the requirement, determine the resource number corresponding to the acquired volume of data to be transmitted according to a mapping relationship among volume of data-carried, uplink channel quality indication, and resource number, and combine the resource number with the user equipment uplink channel quality indication to generate the final resource profile.

6. The base station according to claim 4, wherein the resource allocator is further configured to, in determining the resource profile code:
look up a minimum volume of data-carried equal to or greater than the acquired volume of data to be transmitted based on the mapping relationship between the volume of data-carried and resource profile code, and
select a resource profile code corresponding to the minimum volume of data-carried as the resource profile code.

7. A communication system having a terminal in communication with a base station via an uplink shared channel, the communication system comprising:
the base station, which is configured to:
acquire a volume of data to be transmitted and a terminal uplink channel quality indication from the terminal;
based on the acquired volume of data to be transmitted, determine a set of resource profiles, each having an uplink channel quality indication and a resource number, by:
determining a resource profile code corresponding to the acquired volume of data to be transmitted based on a mapping relationship between volume of data-carried and resource profile code, each resource profile code corresponding to one set of resource profiles; and
calculating the set of resource profiles from the resource profile code using a conversion formula that is: resource profile code=uplink channel quality indication×weight factor 1+resource number× weight factor 2, where one of weight factor 1 and weight factor 2 is set based on a bandwidth uplink shared channel and the other weight factor is set to 1;
judge whether or not the uplink channel quality indication comprised within one of the set of resource profiles is identical to the terminal uplink channel quality indication, and when one is identical, use the one of the set of resource profiles as a final resource profile, and when none are identical:
combine an uplink transmission power with the set of resource profiles to determine the final resource profile by:
selecting resource profiles from the set of resource profiles that meet a requirement that their uplink channel quality indications are smaller than the terminal uplink channel quality indication;
when multiple sets of resource profiles meet the requirement, calculating the uplink transmission power of each set of resource profiles respectively, and selecting the resource profile of minimum uplink transmission power as the final resource profile; and
when only one resource profile meets the requirement, using it as the final resource profile; and
receive data transmitted from the terminal at the base station via the uplink shared channel based on the final resource profile.

* * * * *